May 11, 1948.  B. G. EATON  2,441,261
COMPUTING DEVICE
Filed Jan. 26, 1946  2 Sheets-Sheet 1

Inventor
BYRON G. EATON
By Smith + Juck
Attorneys

May 11, 1948.　　　　B. G. EATON　　　　2,441,261
COMPUTING DEVICE
Filed Jan. 26, 1946　　　2 Sheets-Sheet 2

Inventor
BYRON G. EATON

By Smith & Juck
Attorneys

Patented May 11, 1948

2,441,261

UNITED STATES PATENT OFFICE 2,441,261

COMPUTING DEVICE

Byron G. Eaton, Seattle, Wash.

Application January 26, 1946, Serial No. 643,548

5 Claims. (Cl. 235—89)

This invention relates to a computing device and, more particularly, to a device useful in educational instruction to demonstrate the results of various mathematical computations such as multiplication, division, addition and subtraction.

It is a prime object of this invention to provide a computing device that is simple to construct, being of a minimum number of mechanical parts; is easy to operate rapidly and accurately to show a wide variety of mechanical results; and one which will have a long and useful life, not subject to easy disarrangement or maladjustment under normal use.

Another object of my invention is to provide in a computing device, an element that is shiftable laterally and longitudinally to directly position relative a viewing crotch, the result of a mathematical computation of two selected numerals.

A still further and more specific object of my invention is the provision in a computing device of the type described, of longitudinally and laterally movable tracks which carry movable thereon a chart for positioning various results displayed on the chart at a preselected viewing point, and which is not deleteriously affected by hard usage or rough, erratic usage as by children, and which may be arranged for interchangeable display of various mathematical subjects upon the viewed face of said movable member.

The foregoing objects and others ancillary thereto, I prefer to accomplish as follows:

According to a preferred embodiment of my invention, I provide a member forming a viewing surface, in which member is a window, a portion at least of which has right-angularly positioned adjacent edges forming a viewing crotch. Specifically, this member is a work surface, transparent or non-transparent, but including a viewing window which may, in the case of non-transparency, be an opening that may be filled if desired with a transparent pane. Behind the viewing surface and movable laterally and longitudinally relative thereto, are means forming guide tracks which may take the form of rods or bars. Mounted upon the guide tracks is a plane member, generally alined parallel to and behind said viewing surface. This member is reciprocally moved in two directions relative said viewing crotch, and by and on said guide tracks. This member has arranged on its face, visible through the viewing crotch, the results of mathematical computations from the numerical series arranged along the X and Y-axes of a chart placed on said member.

For simplicity of understanding, I shall confine this description hereafter to the use of this computing device in demonstrating the results of multiplication of numerals in the X-axis by numerals in the Y-axis. It will be apparent, of course, that the results could be that of addition, subtraction, and division, as well. To one side of the viewing surface are positioned movable selector members having associated therewith numerical series, each of which correspond to one or the other of the series alined on the X and Y-axes of the movable member. These movable selector members are suitably connected, each to a guide track, so that when the selectors are moved, a corresponding movement of the guide track connected thereto is obtained, and as a result a similar transitional movement of the result-carrying plane member.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 1:
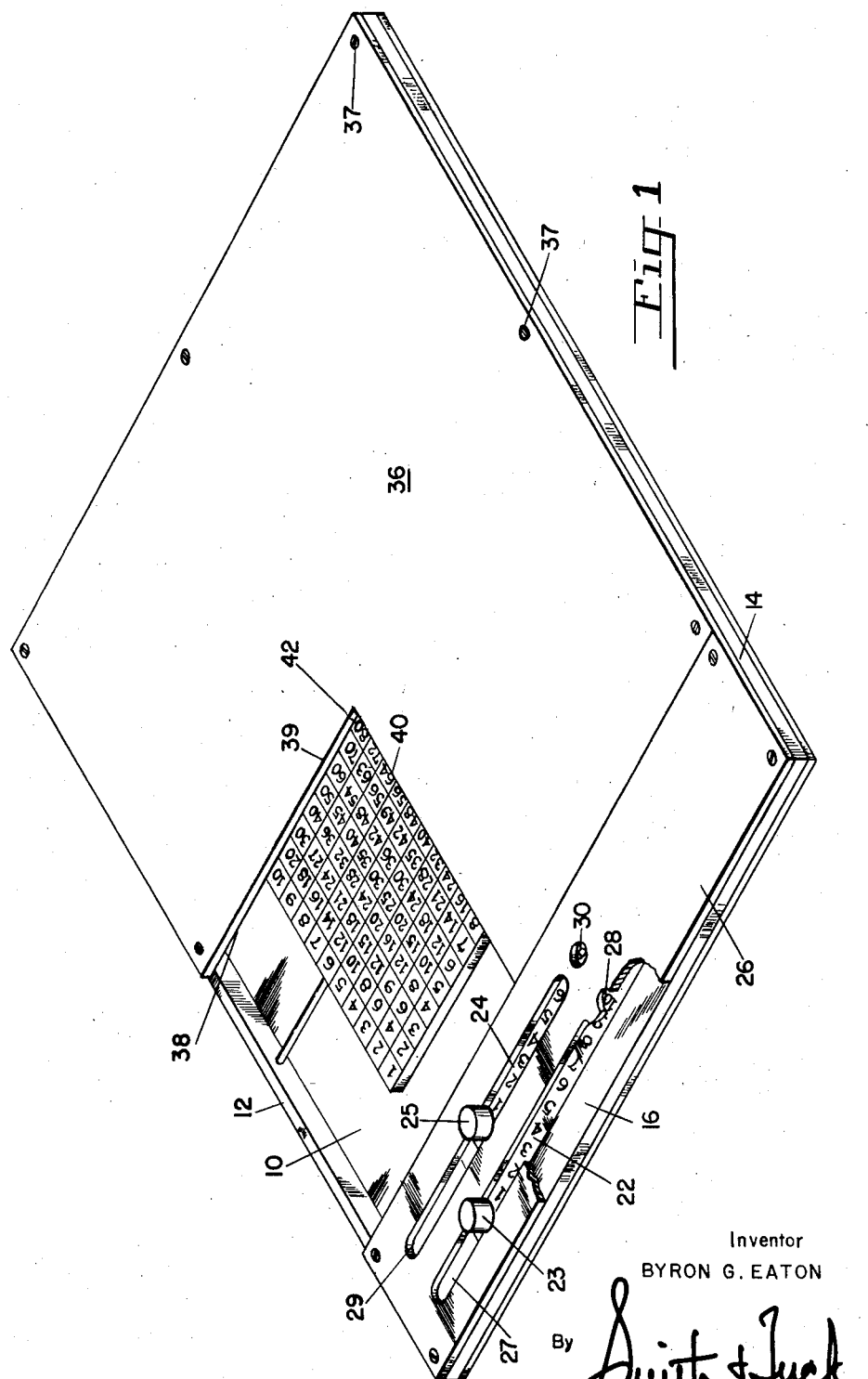
Fig. 1 is a perspective view of a computing device according to my invention, with portions broken away for convenience of illustration.
Figure 2:
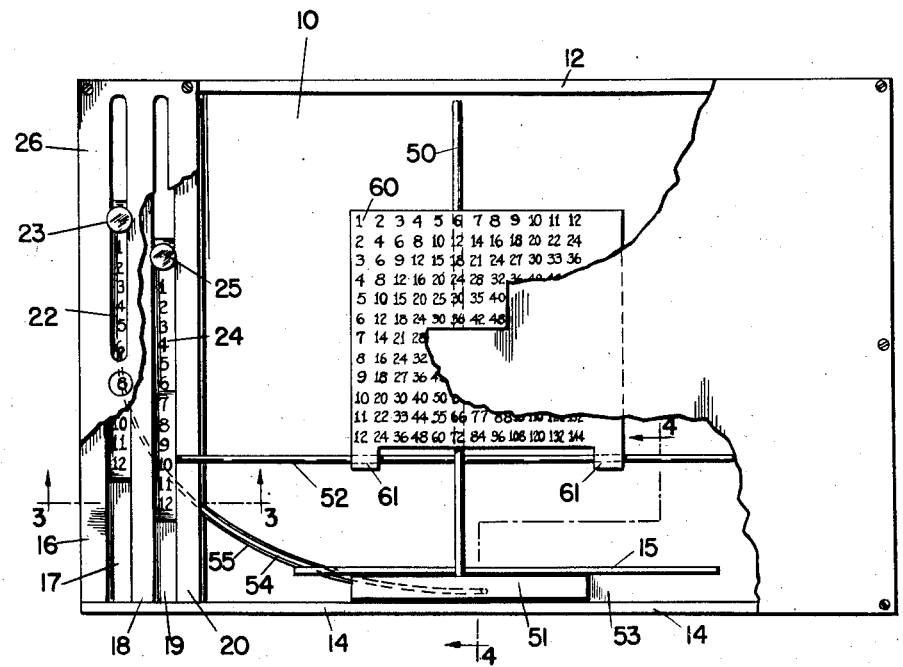
Fig. 2 is a face view of the device in Fig. 1, with portions broken away to reveal those underlying the visible face.

In the preferred form of my invention, upon the baseboard 10 are flanged top and bottom edges 12 and 14, side edge 16, and the slightly spaced-apart guide bars 18 and 20, the latter bar being of relatively thin material. Between bars 16 and 18 is formed a groove 17, and between bars 18 and 20 is formed a groove 19.

Longitudinally movable in groove 17 is slider 22. Similarly movable in groove 19 is the slider 24. The two grooves 17 and 19 are closed and sliders 22 and 24 are covered by the suitably secured cover plate 26 which is slotted at 27 over groove 17 and slider 22, and has slot 29 over groove 19 and slider 24. Extending through the slot 27 is the large headed pin 23, and through slot 29 extends the large headed pin 25, which pins may be manually grasped for movement of their respective sliders. Adjacent an end of each of the slots 27 and 29 are viewing apertures 28 and 30, respectively, through which a numeral of a series carried by each of the sliders may be seen for selection purposes.

The remainder of the space enclosed by the edge flanges of the base 10 is covered by the plane work surface panel 36, here shown as being secured in place by screws 37 and having a window aperture 38 of substantial size, at least two edges of which, 39 and 40, form the right-angularly disposed edges of viewing crotch 42. It will be apparent to those skilled in the art that the window 38 may be considerably smaller than that shown in drawings, and, in fact, may be only slightly larger than necessary for viewing a neatly lettered mathematical result that may be displayed thereunder.

Figure 3:
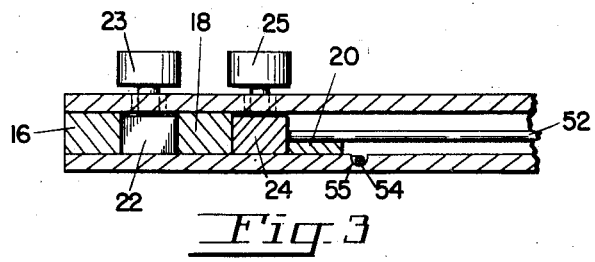
Fig. 3 is a sectional line taken on line 3—3 of Fig. 2.
Figure 4:
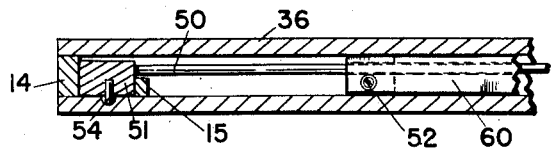
Fig. 4 is a cross-sectional view taken on line 4—4 of Fig. 2.

Mounted between the opposed faces of the panels 10 and 36 is a pair of right-angularly disposed tracks formed by longitudinal rod 50 and lateral rod 52. Rod 50 has at one end a cross-head or carrier 51 guided during movement in groove 53 which lies between the edge flange 14 and the spaced apart guide bar 15. A cable 54 secured at one end to cross-head 51, and at the other end to slider 22, can be seen in Fig. 3 to be guidedly mounted in groove 55 in the panel 10. Sliding movement of the slider 22, manually imparted by means of the knob 23, is translated into lateral movement of cross-head 51 in groove 53, and of rod 50. This rod 50 passes through a suitable opening provided therefor in the rectangular member 60 which slides along the axis of the rod. Rod 52 is coupled with slider 24 and has slideably mounted thereon, by means of ears 61, the rectangular member 60 which can well be designated a chart or scale.

Member 60 is a chart in the X-axis of which is a sequence of numerals, here shown as from one through twelve, inclusive. In the Y-axis, beginning at a point of origin common with that of the X-axis numerals, is a second series of numerals also running from one through twelve, inclusive. Such numerals divide these axes, and at the intersections of the axes of abscissas with each of the several axes of ordinates is the result of a mathematical computation involving the numerals from which said axes originated. In this case wherein we are dealing with multiplication it will be noted that the result, "forty-eight" is at the intersection of the axes of abscissas of the numeral eight in the X-axis with the axes of ordinates of the numeral six in the Y-axis. Similarly displayed on the face of the rectangular member 60 are all the results of the various mechanical computations possible from the numerals used illustratively herein.

In operation, an instructor, a student, or a computor desiring to visibly demonstrate the result of multiplying any given numeral in the series of the scope of the present arrangement on either axis, merely moves the knob 23 and the slider 22 so that through aperture 28 may be seen either the multiplier or the multiplicand of the two numbers to be multiplied together. Similarly, by moving the slider 24 so that through aperture 30 may be seen the other numeral of the pair, the rectangular member 60 will be shifted laterally and longitudinally respectively to such an extent that there will be visible in the viewing crotch 42 the result of the multiplication of the two numbers selected by movement of the sliders 22 and 24.

While I have shown and described particular embodiments of my invention, it will occur to those skilled in the art that various changes and modifications may be made without departing from the invention, and I therefore aim in the appended claims to cover all such changes and modifications as fall within the true spirit and scope of my invention.

Having thus described my invention, I claim:

1. A computing device, comprising: means forming a viewing surface having a window therein containing a right angular viewing crotch; means forming behind said surface longitudinal and lateral movable guide tracks; a member movably mounted on said guide tracks and movable therewith; said member having thereon rectilineally arranged X and Y-axes divided into numerals and aligned with said directions of movement; said member having, at the intersections of the various axes of abscissas with the various axes of ordinates, the result of a mathematical computation involving the numerals from which said axes originate; a pair of movable selector members, movable in one of said directions, each member having associated therewith a series of numerals corresponding to the numerals of one of said axes; straight-line means to guide movement of said movable selector members; means coupling one of said selector members to the lateral movable guide track; and means coupling the other selector member to the longitudinal movable guide track.

2. A computing device, comprising: means forming a viewing surface having a window therein containing a right angular viewing crotch; a member reciprocally movable behind said window in a longitudinal and lateral direction relative said viewing crotch; longitudinal and lateral movable guide means for said member; said member having thereon rectilineally arranged X and Y-axes divided into numerals and aligned with said directions of movement; said member having, at the intersections of the various axes of abscissas with the various axes of ordinates, the result of a mathematical computation involving the numerals from which said axes originate; a selector knob movable relative said surface to select a numeral of the series of the X-axis; guided cable means between said selector means and the laterally movable guide means to move said member parallel to its X-axis; and a selector knob movable relative said surface to select a numeral of the series of the Y-axis and connected to longitudinally movable guide means to move said member parallel to its Y-axis; said movement being of a degree to position the intersection of the axes of the selected numerals in said viewing crotch.

3. A computing device, comprising: means forming a viewing surface having a window therein containing a right angular viewing crotch; a member reciprocally movable behind said window in a longitudinal and lateral direction relative said viewing crotch; means forming longitudinal and lateral movable guide tracks for said member; said member having thereon rectilineally arranged X and Y-axes divided into numerals and aligned with said directions of movement; said member having, at the intersections of the various axes of abscissas with the various axes of ordinates, the result of a mathematical computation involving the numerals from which said axes originate; selector means movable relative said surface to select a numeral of the series of the X-axis; means between said selector means and the laterally movable guide track to move said member parallel to its X-axis; selector means movable relative said surface to select a numeral of the series of the Y-axis; and means between said selector means and longitudinally movable guide track to move said member parallel to its Y-axis, said movement being of a degree to position the intersection of the axes of the selected numerals in said viewing crotch.

4. A computing device, comprising: means forming a viewing surface having a window therein containing a right angular viewing crotch; a member reciprocally movable behind said window in a longitudinal and lateral direction relative said viewing crotch; longitudinal and lateral movable guide means for said member; said member having thereon rectilineally arranged X and Y-axes divided into numerals and aligned with said directions of movement; said member having, at the intersections of the various axes of abscissas with the various axes of ordinates, the result of a mathematical computation involving the numerals from which said intersecting axes originate; selector means movable relative said surface to select a numeral of the series of the X-axis; means between said selector means and the laterally movable guide means to move said member parallel to its X-axis; selector means movable relative said surface to select a numeral of the series of the Y-axis; and means between said selector means and the longitudinally movable guide means to move said member parallel to its Y-axis; said movement being of a degree to position the intersection of the axes of the selected numerals in said viewing crotch.

5. A computing device, comprising: means forming a plane viewing surface having a window therein containing a right angular viewing crotch; means forming behind said surface substantially parallel therewith longitudinal and lateral movable guide tracks; means for moving said guide tracks in a flat plane adjacent said surface and in right angular relation to each other; a member reciprocably movable on said tracks behind said window in a longitudinal and lateral direction relative to said viewing crotch; said member having thereon rectilineally arranged X and Y-axes divided into numerals and aligned with said directions of movement; said member having, at the intersections of the various axes of abscissas with the various axes of ordinates, the result of a mathematical computation involving the numerals from which said axes originate; and means for moving each said track whereby movement of one track causes the member to move on the other track.

BYRON G. EATON.

REFERENCES CITED

The following references are of record in the file of this patent:

UNITED STATES PATENTS

| Number | Name | Date |
|---|---|---|
| 294,079 | Robinson | Feb. 26, 1884 |
| 860,662 | Herbert | July 23, 1907 |
| 1,527,663 | Beery | Feb. 24, 1925 |
| 1,726,370 | Smith | Aug. 27, 1929 |
| 1,751,106 | Shelledy | Mar. 18, 1930 |
| 1,974,901 | Stadler | Sept. 25, 1934 |